United States Patent [19]

Bruce, Jr. et al.

[11] 4,349,972
[45] * Sep. 21, 1982

[54] SHELLFISH DREDGE CHAFING GEAR

[75] Inventors: Walter J. Bruce, Jr., New Bedford; Wayne M. Bruce, South Dartmouth, both of Mass.

[73] Assignee: Bruce's Splicing & Rigging Co., Inc., New Bedford, Mass.

[*] Notice: The portion of the term of this patent subsequent to May 11, 1999, has been disclaimed.

[21] Appl. No.: 257,568

[22] Filed: Apr. 27, 1981

Related U.S. Application Data

[63] Continuation-in-part of Ser. No. 201,496, Oct. 28, 1980, Pat. No. 4,328,629.

[51] Int. Cl.$^3$ ............................................. A01K 73/02
[52] U.S. Cl. ............................................. 37/55; 43/9; 43/4.5
[58] Field of Search .................. 43/4, 5, 7, 9, 100, 43/104; 37/55, 122, 119; 56/8; 172/392, 747, 764; 404/118; 15/53 R, 53 A

[56] References Cited

U.S. PATENT DOCUMENTS

| | | |
|---|---|---|
| 97,420 | 11/1869 | Mayhew . |
| 1,104,154 | 7/1914 | Stinson ................................. 37/119 |
| 1,480,192 | 1/1924 | Worsfold . |
| 2,658,216 | 11/1953 | Shusett et al. ...................... 15/53 R |
| 2,684,549 | 7/1954 | Olden ..................................... 43/9 |
| 2,686,380 | 8/1954 | Seppala ................................. 43/9 |
| 3,120,714 | 2/1964 | Goodwin ............................... 43/9 |
| 3,367,048 | 2/1968 | Doughty ................................ 37/55 |
| 3,561,150 | 2/1971 | Silchenstedt ........................ 43/4.5 |
| 3,608,217 | 9/1971 | Voisin ................................. 43/9 X |
| 3,973,575 | 8/1976 | Sullivan et al. ..................... 37/55 X |
| 4,112,602 | 9/1978 | Kato . |

Primary Examiner—Stephen G. Kunin
Assistant Examiner—Robert P. Olszewski

[57] ABSTRACT

A device for protecting shellfish dredge chain bags, featuring arcuate strips of reinforced rubber adapted to be attached to trail beneath the bottom side of the bag to cushion and separate the bag from abrasive action against the ocean floor when it becomes weighted with rocks and shellfish. These strips, in curved form, are cut from the tread or side wall portions of used vehicle tires and are attached to the chain bag in a manner that protects the forward edge and corners of the strip from catching on the ocean floor while allowing the longer portion of the reinforced rubber strip to trail beneath the chain bag. An array of closely adjacent strips effectively defines a wear-resistant surface of the chain bag.

18 Claims, 17 Drawing Figures

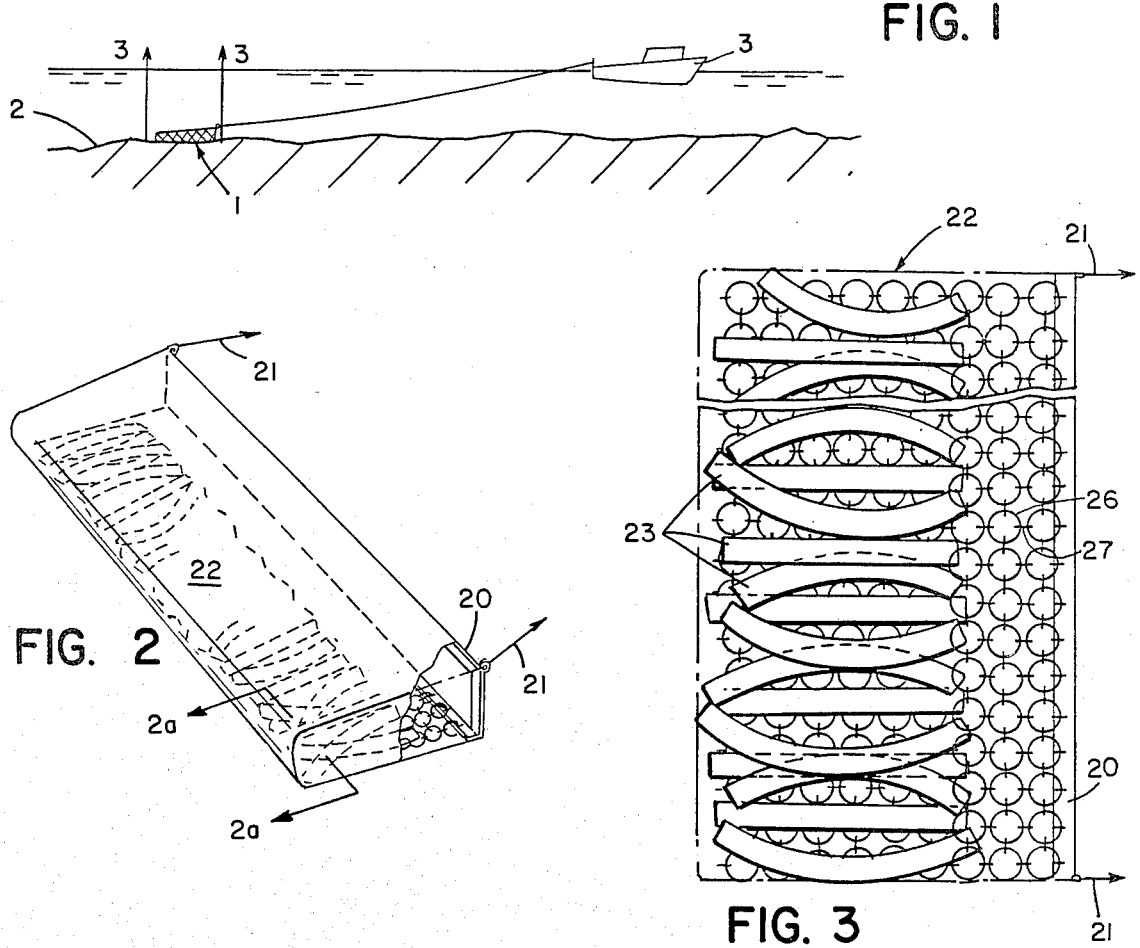
FIG. 1
FIG. 2
FIG. 3
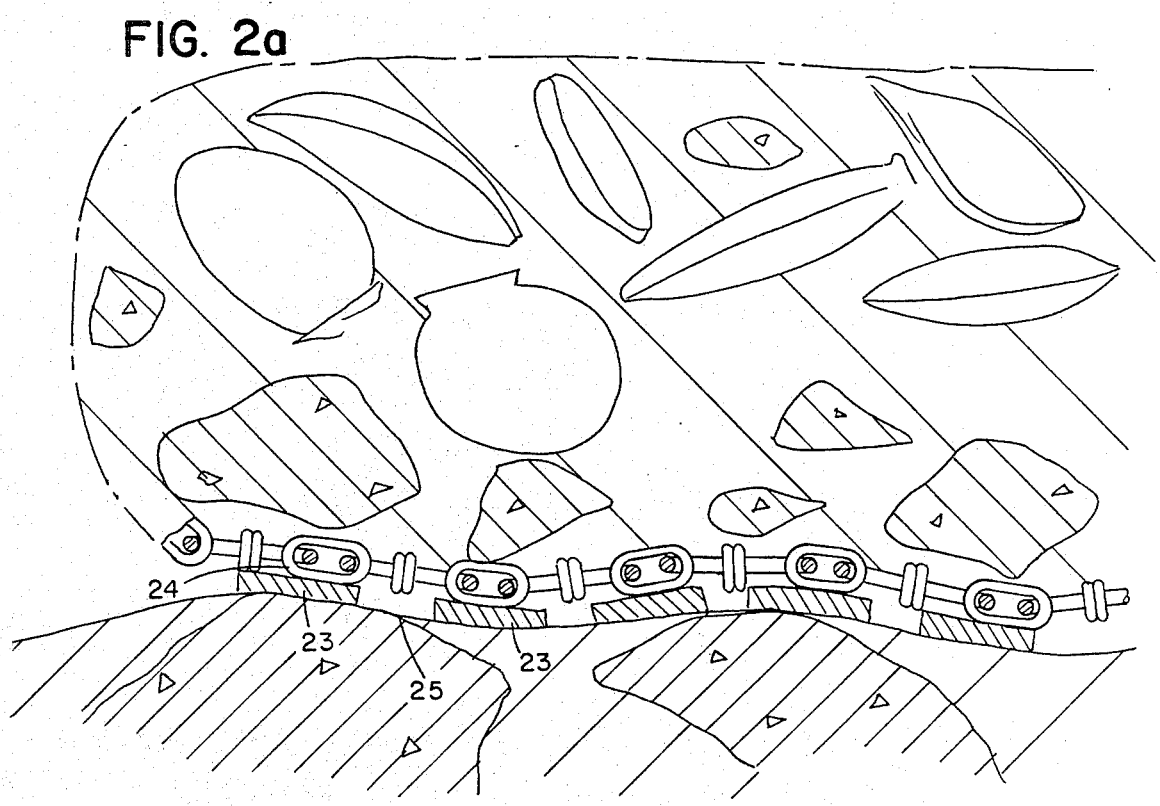
FIG. 2a

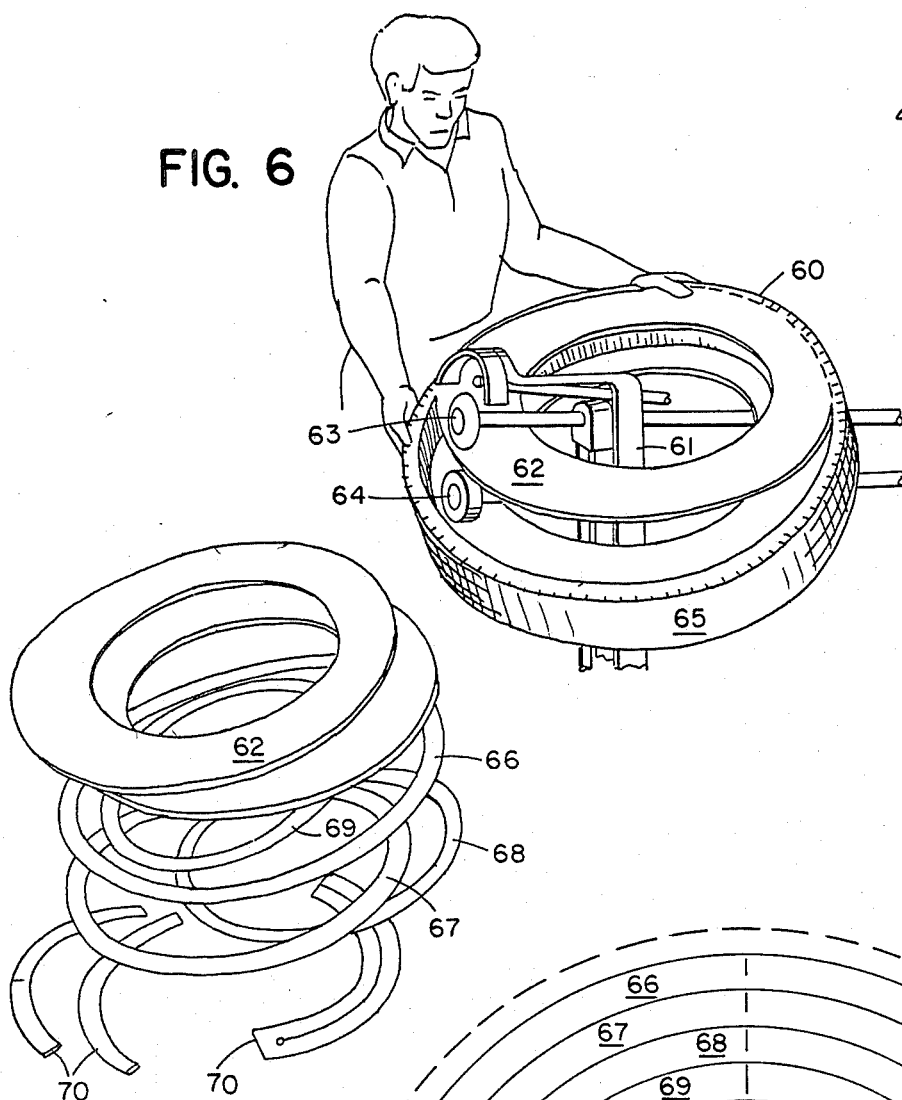
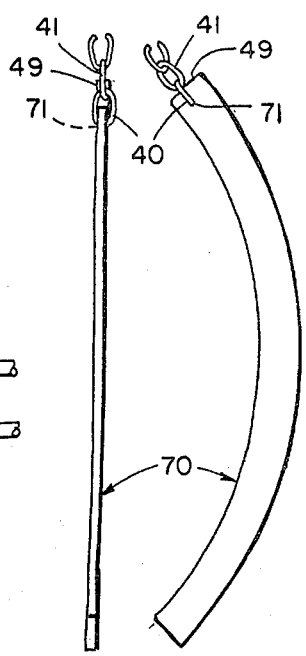
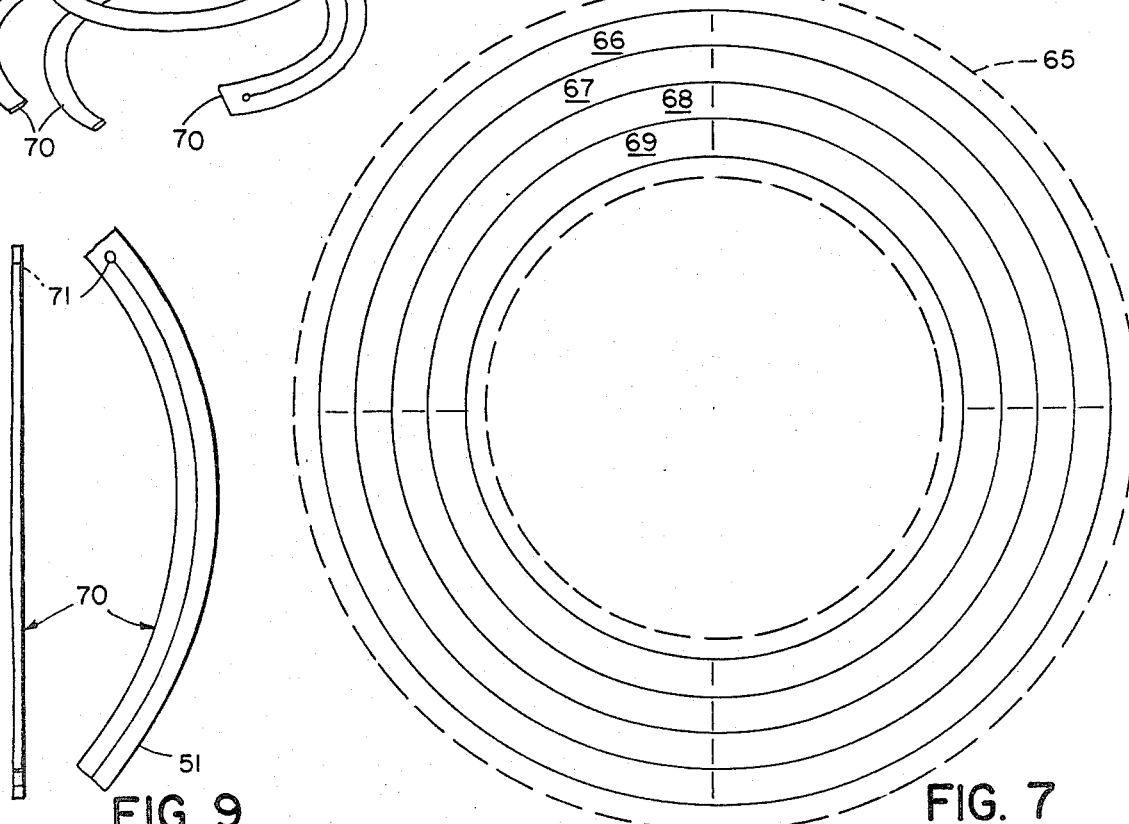
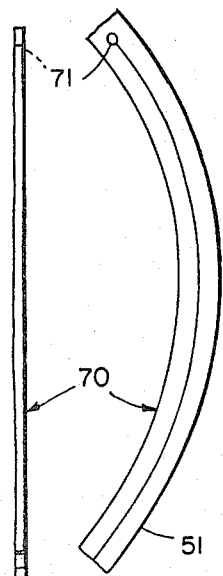
FIG. 6
FIG. 8
FIG. 9
FIG. 7

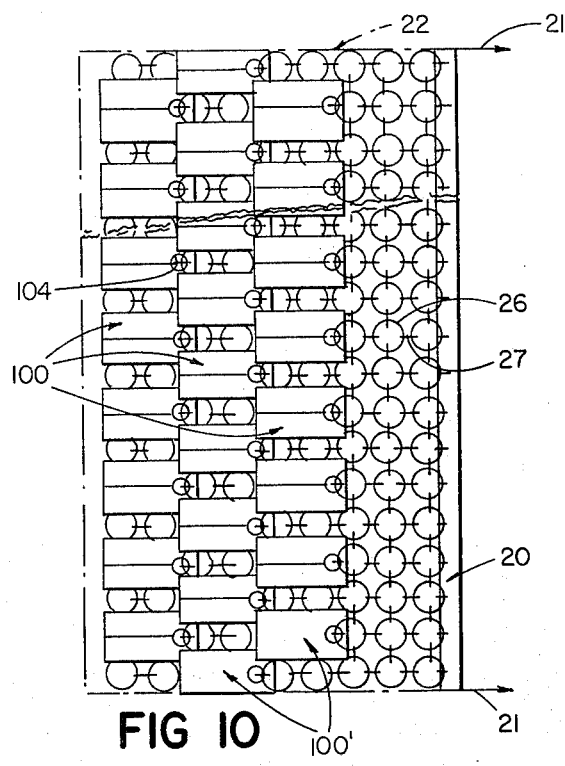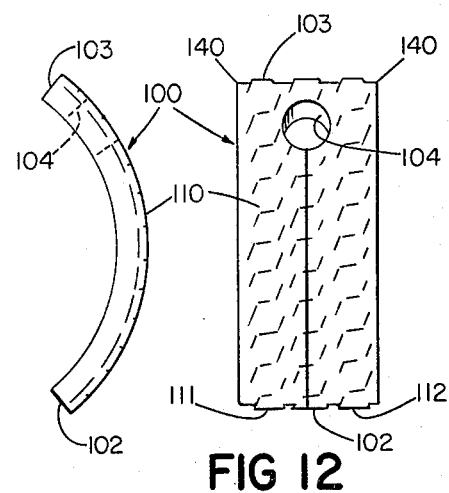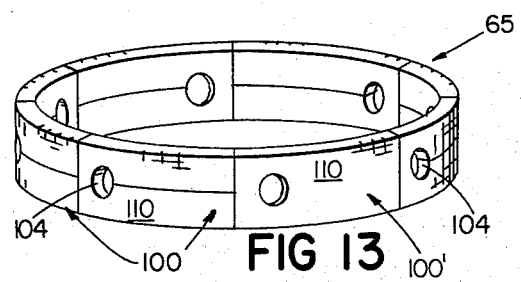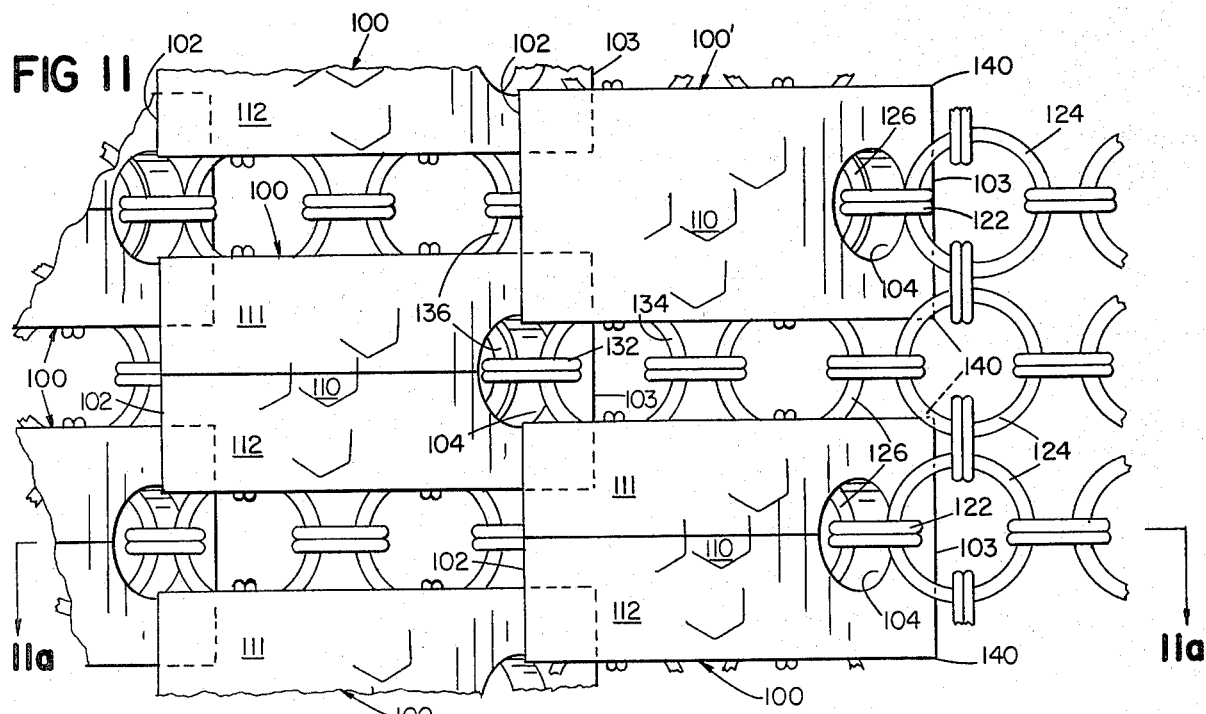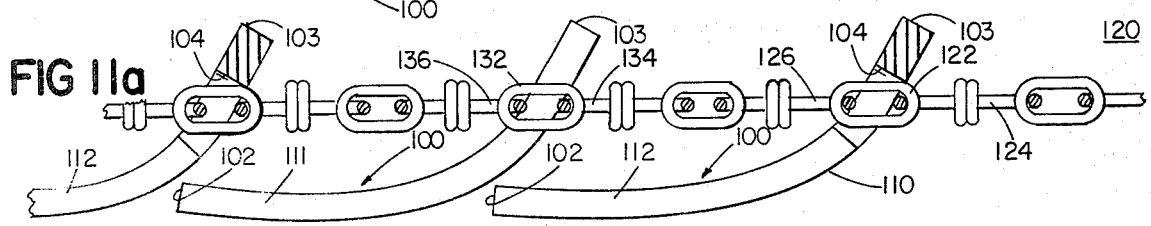

SHELLFISH DREDGE CHAFING GEAR

BACKGROUND OF THE INVENTION

This application is a continuation-in-part of our copending U.S. application Ser. No. 201,496, filed Oct. 28, 1980, now U.S. Pat. No. 4,328,629.

This invention relates to shellfish dredge chain bags.

Shellfish of certain types, i.e. scallops or oysters, are harvested by use of a shellfish dredge. This dredge is comprised of a rectangular metal frame enclosed on one side by a bag constructed of linked steel rings. The dredge device is towed along the ocean floor, the lower section of steel frame constructed to "rake" into the attached chain bag shellfish located in its path. It is the nature of the device that numerous rocks and other objects are also collected. The added weight in the chain bag causes it to chafe, or wear, against the ocean bottom thereby making it necessary to remove the chain bag from service for repair or replacement after each harvesting trip. It has been attempted to use sections from other damaged bags attached beneath the chain bag to extend the useful life of the bag but this has added unnecessary weight, making equipment more difficult to handle.

It is the objective of this invention to provide a means to give better protection to shellfish chain bags with an apparatus that is cheap and easy to handle. It is also an objective to provide a means to give increased use of shellfish chain bags with reduced repair and replacement requirements.

SUMMARY OF THE INVENTION

According to the invention it has been found that effective chafing gear can be provided in the form of elongated rubber strips, especially strips that are cut from used vehicle tires, the strips being attached to trail beneath the chain bag in a manner to protect the underside of the chain bag. The elongated strips separate the full weighty cain bag from wear-producing pressure contact with the hard and rough surface of the ocean floor and thereby reduce wear of the bag to allow multiple harvesting trips between repair or replacement of the chain bag. By dispersing the leading ends of the strips within the chain bag, the forward edge and corners of the strip are protected from catching on the ocean floor.

The invention especially features the circumferential cutting and separation of the side wall portion of a used vehicle tire from its tread portion and cutting from the resulting annular segments of the tread or side wall portions, strips of generally elongated form that retain acurvature that generally corresponds to the shape of the original tire segment. Such a strip is then adapted to be attached at one end to a forward part of the chain bag, the curved strip adapted to trail from the point of attachment, in wear-protecting relationship to the underside of the chain bag. By use of the curved form, a large part of the used tire can be usefully employed in manufacture of the chafing gear strips; the curved nature of the strip is found not to detract from its effectiveness and, in fact, increases the strength of the strip by conforming to the configuration of the reinforcing fabric within the tire segment.

In the case of tread portions, the cylindrical nature of the curve and the generally greater rigidity of tread region is accommodated by sizing the strips so that a number of rows are used, preferably the trailing portion of a forward row overlapping the next following row, to provide an effective skid upon the ocean floor. The curved nature of strips made from sidewalls causes those strips to lie, in part, transverse to the direction of travel of the dredge. This curvature can be employed also to provide overlapping to provide an effective skid upon the ocean floor.

In preferred embodiments, a hole through the reinforced rubber strip is adequate to provide a means of attachment that can withstand the rigorous conditions of use. For attaching segments cut from the sidewall portions, for instance, the strips are attached by means of chain links at one end of the strip, the strip being attached from above the bottom portion of the bag at a point near the steel frame and the unattached end of the strip passing between links in the bag posterior to the attaching location to trail beneath the chain bag. In another preferred embodiment, e.g. for attaching segments cut from the tread portions, the attaching is achieved by splitting the strip from its rear end to a hole close to the forward end to form two legs or ends, and, from above the bottom portion of the chain bag, passing the legs on either side of a link in the cabin bag to engage the hole about the link while the legs of the strip trail beneath the chain bag.

In the case of new manufacture of chain bags, the strips can be incorporated in the design, with links of the chain bag passing directly through holes in the strips without need of extra links or splitting of the strips.

PREFERRED EMBODIMENT

The structure and operation of a preferred embodiment of the invention will now be described, after first briefly describing the drawings.

DRAWINGS

FIG. 1 is an isometric view of a shellfish dredging operation;

FIG. 2 is an isometric view of a shellfish dredge employing the invention;

FIG. 2a is a section view at 2a—2a of FIG. 2 showing operation of a shellfish dredge employing the invention;

FIG. 3 is a partial bottom view of a shellfish dredge employing the invention;

FIG. 6 is an isometric view of the preferred method of reducing the sidewall portions of a vehicle tire to arcuate strips;

FIG. 7 is a plan view of a vehicle tire side wall marked for cutting to arcuate strips;

FIG. 8 is a face and side plan view of a sidewall strip according to a preferred embodiment;

FIG. 9 is a face and side plan view of a sidewall strip according to an alternate embodiment;

FIG. 10 is a partial bottom view of a shellfish dredge chain bag employing the invention;

FIG. 11 is a plan view of preferred embodiments of the method of attachment for segments cut from the tread portion looking up at the bottom of the bag;

FIG. 11a is a section view at 11a—11a of FIG. 11;

FIG. 12 is a bottom face and side plane view of a tread strip according to a preferred embodiment; and FIG. 13 is an isometric view of the preferred method of reducing the tread portion of a vehicle tire to arcuate strips.

STRUCTURE

Figure 4:
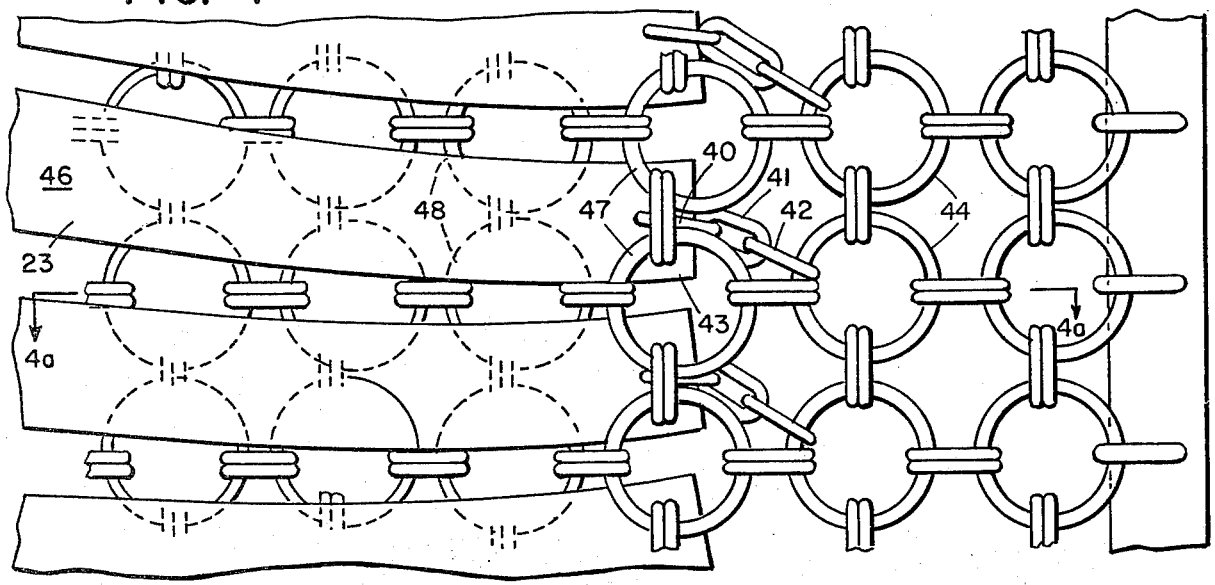
FIG. 4 is a plan view of the preferred embodiment of the method of attachment of segments cut from the sidewall portion lookng up at the bottom of the bag.
Figure 4A:
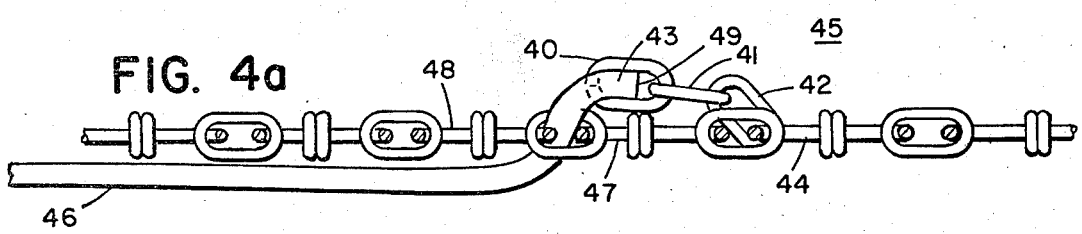
FIG. 4a is a section view at 4a—4a of FIG. 4.

In FIG. 1, the shellfish dredge 1 is towed along the ocean floor 2 behind a boat 3. The shellfish dredge (FIGS. 2, 3 and 10) is comprised of a rectangular frame 20 which is attached by means of cable 21 to the tow boat. Attached to the frame and trailing behind is a chain bag 22 composed of steel rings 26, connected by links 27 to the rings on four sides. In commercial applications, each ring has an inner diameter of 3 inches and one side of a chain bag is 10 rings long and from 28 to 54 rings wide.

Attached beneath the chain bag are arcuate strips of rubber (23, FIG. 3; 100, FIG. 10) cut from vehicle tires, e.g. strips cut from the tread (FIGS. 10—13) or from the sidewall (FIGS. 3–9) or a combination of both, the strips acting as a cushion (FIG. 2a) between the chain bag lower side 24 and the ocean floor 25.

The strips cut from the tire sidewalls may be attached to the chainbag by links at FIG. 4. The links 40 through 42 connect one end of the strip 43 to the chain bag at the second row of rings 44 behind the rectangular frame from above 45 the bottom side of the chain bag. The unattached end of the rubber strip 46 is threaded between the third row 47 and fourth row 48 of chain bag links to cause the longer portion of the strip 46 to trail beneath the chain bag, while the corners and the leading edge of the strip 49 and the attaching means are within the chain bag thereby protected from abrasion on the ocean floor.

The strips formed from the vehicle tire tread section (FIGS. 12 and 13) may be attached to the bottom of the chain bag in an overlapped array, as at FIG. 11. Rubber strip 100 is split from rearward end 102 to hole 104, typically 2¼ inches in diameter, cut near forward edge 103. The split ends 111, 112 are passed from above 120 the bottom sie of the chain bag (FIGS. 11 and 11a) on either side of chain link 122 with the tread face 110 of the strip toward the frame 20 so the tread face, which, as the road surface engaging portion of the vehicle tire, is especially provided with high wear resistance characteristics, will contact the ocean floor during the dredging operation. Due to the relative stiffness of strips 100 caused by thickness of the tread section, typically ½ to 1½ inches, short strips, typically of the order of 12 inches long, are attached to the bag in rows. This stiffness allows the split technique as strip 100 resists deformation in the area of hole 104 about link 122 during contact with the ocean floor, while the reinforcing fabric in the tire and the tread thickness combine to resist tearing, thereby preventing disengagement of strip 100 from the chain bag. The holes 104 of the strips in the first row are typically engaged about links 122 connecting the second row 124 and the third row 126 of chain rings behind the frame 20, on alternating links across the row, e.g. the 1st, 3rd, 5th, etc. links. The next row of strips is typically engaged on the links connecting the fourth row 134 and the fifth row 136 of chain rings behind the frame 20, and are offset from the first row, i.e., for example, on the 2nd, 4th, 6th, etc., links. The hole 104 engages around link 132, and the ends 111, 112 trail beneath the chain bag with the tread face 110 in contact with the ocean floor, while the corners 140 and the leading edge 103 of the strip 100 remain protected within the bag.

Referring to the strip 100' (FIGS. 10, 11 and 13) which omits the split line, this is intended to suggest that, during manufacture of a new bag, strips without slits can be applied to the links of the chain bag as manufacture of the bag proceeds.

OPERATION

In FIG. 6, a used vehicle tire 60 is placed on a cutting apparatus 61 whereby the tire sidewall 62 is impinged between a rotating cutting wheel 63 and a rotating drive wheel 64. Each side wall is cut from the tire at a position close to the tread section 65. Thereafter, each sidewall is cut into four concentric rings, 66 through 69 and each ring is cut into 3 or more arcuate strips 70, each strip being approximately 2 to 3 inches wide and 24 to 30 inches long. A hole 71 is cut in the forward end of each strip for the means of attachment.

The tread segment 65 (FIG. 13) cut from the used vehicle tire is also used for this invention. The tread segment is cut into one or more annular rings, each approximately 5 to 6 inches wide. The portion usable for this invention varies relative to tire design and amount of wear, usually including the tread center section and less frequently including the edge sections, which are generally too thick, the preferred thickness being ½ to 1½ inches. Each annular ring is cut into a number of end-to-end arcuate strips, each approximately 12 inches long, that are curved in the circumferential direction of the tire tread segment.

The arcuate strips 70 cut from the sidewall portions 62 are prepared for attaching by inserting a chain link 40 through the hole 71 at the forward end 49 of the strip. A second link 41 is closed through the first link.

The strip is attached to the chain bag from above the bottom side of the bag by closing a chain link 42 around the link secured to the strip and the second row of chain bag rings. The unattached end of the strip 46 is passed between the third row 47 and the fourth row 48 of rings. When the dredge is towed along the ocean floor, the free end of the strip trails beneath the chain bag to cushion and separate the chain bag from the ocean floor, while the attaching means and the lead end of the stri are within the chain bag.

The strips 100 cut from the tread portion 65 (FIG. 13) are prepared for attaching (FIG. 12) by cutting hole 104 near the lead edge 103 of the strip and splitting the strip from the rearward end 102 to the hole. The split ends 111, 112 (FIGS. 11 and 11a) are passed from above 120 the bottom side of the chain bag, with the tread face 110 toward the frame 20, on either side of the desired chain link, e.g. link 122 or link 132, connecting the rows of chain rings, e.g. the second row 124 and third row 126 or the fourth row 134 and fifth row 136, behind the frame of the chain bag. The hole 104 in the strip engages about the chain link, and the split ends trail beneath the chain bag while the corners 140 and the leading edge 103 of the strip remain protected within the chain bag. The strips are employed to provide general coverage for the bottom of the chain bag by means of arrangement in a somewhat shingled, overlapped array.

OTHER EMBODIMENTS

Other embodiments of the invention are within the claims. For example, the rubber strip 70 (FIG. 9) cut from the sidewall portion of the vehicle tire is split from rear end 51 to the hole 71 cut near the forward end 53.

Figure 5:
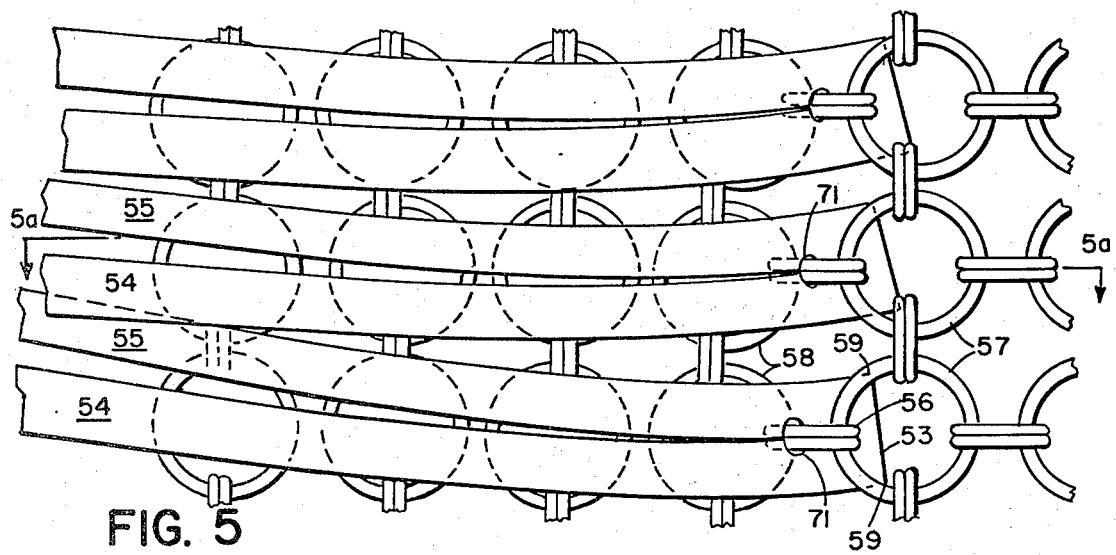
FIG. 5 is a plan view of an alternate embodiment of the method of attachment of segments cut from the sidewall portion lookig up at the bottom of the bag.
Figure 5A:
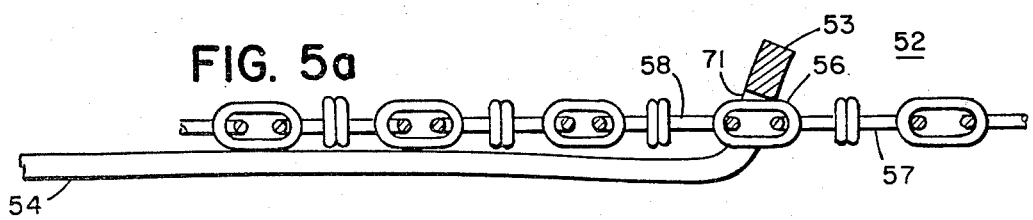
FIG. 5a is a section view at 5a—5a of FIG. 5.

The split ends 54 and 55 (FIGS. 5 and 5a) are passed from above the bottom side of the bag 52 on either side of a chain link 56 connecting the second row 57 and third row 58 of chain rings in the chain bag. The hole 71 in the strip engages about the chain link 56, and the split ends trail beneath the chain bag, while the corners 59 and the leading edge 53 of the strip remain protected within the chain bag. Also, tread strips 100 and sidewall strips 65 may be combined in any proportion to provide protection for a shellfish dredge chain bag bottom. Further, used rubber fabrications, e.g. endless belting, may be employed in broader aspects of the invention.

In the manufacture of new chain bags, or when particular link sections are replaced in old bags, strips 100' (FIGS. 10, 11 and 13) omitting the split line may be employed by passing the link 122 through hole 104 before attachment to one of the adjacent rings 124, 126.

What is claimed is:

1. A shellfish dredge chain bag having means for protection from wear caused by dragging on the ocean floor in the form of an array of elongated strips of reinforced rubber,
   said strips having forward ends attached to the bottom of said chain bag in the manner to trail beneath said chain bag in a protective relationship to the underside of said bag,
   wherein at least a portion of said elongated strips are segments cut from tread sections of used vehicle tires, the tread surfaces facing downwardly.

2. The chain bag of claim 1 wherein the leading edges of said strips are disposed in protected position within the chain bag and the bodis of said strips are in position to trail beneath said chain bag.

3. A shellfish dredge chain bag having means for protection from wear caused by dragging on the ocean floor in the form of an array of elongated strips of reinforced rubber,
   said strips having forward ends attached to the bottom of said chain bag in the manner to trail beneath said chain bag in a protective relationship to the underside of said bag,
   wherein at least a portion of said elongated strips are segments cut from tread sections of used vehicle tires, the tread surfaces facing downwardly,
   said tread sections being in a staggered array with the trailing ends of forward sections resting upon forward portions of the next following tread sections.

4. Chafing gear for protecting the bottom portion of a shellfish dredge chain bag from the wear caused by dragging on the ocean floor,
   said chafing gear comprising:
   an elongated strip of reinforced rubber comprising a segment of a used vehicle tire,
   said strip having means at a forward end for attachment to the bottom of the chain bag in the manner that said strip can trail from said point of attachment in protective relationsip to the underside of said chain bag,
   wherein said reinforced rubber strip is a section of the cylindrical tread portion of a vehicle tire, the direction of curvature of said section extending in the direction of length of the strip.

5. The device of claim 4 wherein the means of attachment comprises a hole cut in the forward end of the rubber strip.

6. Chafing gear for protecting the bottom portion of a shellfish dredge chain bag from the wear caused by dragging on the ocean floor,
   said chafing gear comprising:
   an elongated strip of reinforced rubber comprising a segment of a used vehicle tire,
   said strip having means at a forward end for attachment to the bottom of the chain bag in the manner that said strip can trail from said point of attachment in protective relationship to the underside of said chain bag,
   said reinforced rubber strip comprising a section of the cylindrical thread portion of a vehicle tire, the direction of curvature of said section extending in the direction of length of the strip, said means of attachment comprising a hole cut in the forward end of the rubber strip and
   said strip being split longitudinally from the hole into two legs to enable engagement about a link in the chain bag.

7. The device of claim 6 wherein said hole cut in the forward end of said rubber strip is of diameter of the order of 2 inches.

8. Chafing gear for protecting the bottom portion of a shellfish dredge chain bag from the wear caused by dragging on the ocean floor,
   said chafing gear comprising:
   an elongated strip of reinforced rubber,
   said strip having means at a forward end for attachment for the bottom of the chain bag in the manner that said strip trails from said point of attachment in protective relationship to the underside of said chain bag,
   said attaching means comprising:
   a hole cut in the forward end of the rubber strip,
   said strip being split longitudinally from the hole to the rear end of the strip,
   said split and hole adapted to engage about a link in the chain bag.

9. The device of claim 8 wherein said reinforced rubber strip is an arcuate section of a used vehicle tire cut from the tread portion of said tire, with the length of the strip extending in the direction of said tread.

10. The device of claim 6, 7 or 9, wherein said section of the tread portion of a vehicle tire has thickness within the range of ½ to 1½ inches.

11. The device of claim 10 wherein said section is of the order of 12 inches long.

12. A method for providing means for protecting shellfish dredge chain bags from wear caused by dragging on the ocean floor,
   said method comprising:
   cutting a used vehicle tire into at least one annular ring,
   thereafter cutting said ring into a plurality of arcuate strips having a curvature that generally corresponds to the curvature of the original tire section,
   and providing at one end of each said arcuate strip means for attachment of said end to the lower side of a shellfish dredge chain bag,
   said annular ring comprising a generally cylindrical tread section of a used vehicle tire and
   said annular ring is cut into a series of end-to-end strips of cylindrical curvature.

13. The method of claim 12, wherein said means for attachment is provided by forming a hole in the forward end of a said strip.

14. The method of claim 13 including the step of attaching said strip to the chain bag by means disposed through said hole, while arranging the leading edge of said strip in a protected position within the chain bag, and the body of said strip in position to trail beneath said chain bag.

15. A method for providing means for protecting shellfish dredge chain bags from wear caused by dragging on the ocean floor,
said method comprising:
cutting a used vehicle tire into at least one annular ring comprising a generally cylindrical tread section of said used vehicle tire,
thereafter cutting said ring into a plurality of end-to-end arcuate strips having cylindrical curvature that generally corresponds to the curvature of the original tire section,
and providing at one end of each said arcuate strip means for attachment of said end to the lower side of a shellfish dredge chain bag by
forming a hole in the forward end of a said strip, and
attaching said strip to the chain bag by means disposed through said hole, while arranging the leading edge of said strip in a protected position within the chain bag, and the body of said strip in position to trail beneath said chain bag,
a link forming an integral part of said chain bag being selected to serve as said means disposed through said hole for attaching said strip to the chain bag.

16. The method of claim 15 including cutting said strip longitudinally from said hole to split the longer portion of said strip into two legs, and, from above the bottom side of the chain bag, passing said legs on either side of said chain bag link to engage the hole in said strip about said chain bag link and position said legs to trail beneath said chain bag.

17. A method for providing means for protecting shellfish dredge chain bags from wear caused by dragging on the ocean floor,
said method comprising:
cutting from said tread section at least one annular ring, said cutting being along a line generally parallel with the sidewall section;
cutting said tread annular ring into a plurality of arcuate strips having a curvature that generally corresponds to the curvature of the original tread section; and
providing at one end of each said arcuate strip means for attachment of said end to the lower side of a shellfish dredge chain bag.

18. A method for providing means for protecting shellfish dredge chain bags from wear caused by dragging on the ocean floor,
said method comprising:
cutting a used vehicle tire into at least one annular ring,
thereafter cutting said ring into a plurality of arcuate strips having a curvature that generally corresponds to the curvature of the original tire section,
and providing at one end of each said arcuate strip means for attachment of said end to the lower side of shellfish dredge chain bag and by cutting said strip longitudinally,
said cut extending from a hole at the forward end to the rear end, thereby splitting the longer portion of said strip into sections,
and attaching said strip to a chain bag by passing from the above bottom side of the chain bag the split ends of said arcuate strip on either side of a chain bag link to engage the hole in said strip about said chain bag link,
said method locating the securing means and resistive leading edge of the strip within the chain bag away from damaging contact with the ocean floor,
and locating the larger portion of the arcuate strip in protective position between the chain bag and the ocean floor.

* * * * *

Disclaimer 4,349,972.—*Walter Bruce Jr.,* New Bedford, and *Wayne M. Bruce,* South Dartmouth, Mass. SHELLFISH DREDGE CHAFING GEAR. Patent dated Sept. 21, 1982. Disclaimer filed Aug. 14, 1984, by the assignee, *Bruce's Splicing & Rigging Co., Inc.*

Hereby enters this disclimer to claims 4, 5, 12, 13 and 17 of said patent.
[*Official Gazette Sept. 25, 1984.*]